United States Patent [19]
Kuechler

[11] Patent Number: 6,078,589
[45] Date of Patent: Jun. 20, 2000

[54] METHOD AND ARRANGEMENTS FOR THE OPTIMAL USE OF SWITCHING— ORIENTED AND TRANSMISSION— ORIENTED RESOURCES OF MULTIMEDIA COMMUNICATION NETWORKS

[75] Inventor: Rudolf Kuechler, Baierbrunn, Germany

[73] Assignee: Siemens Aktiengesellschaft, Munich, Germany

[21] Appl. No.: 08/883,360

[22] Filed: Jun. 27, 1997

[30] Foreign Application Priority Data

Jun. 27, 1996 [DE] Germany .......................... 196 25 901

[51] Int. Cl.[7] .......................... G01R 31/08; G06F 11/00; G08C 15/00
[52] U.S. Cl. .......................... 370/431; 370/252; 370/253; 370/360; 395/375; 395/750
[58] Field of Search ................................ 370/348, 60, 94, 370/252, 230, 253, 233, 234; 348/9, 10, 12, 13, 6, 7; 395/750

[56] References Cited

U.S. PATENT DOCUMENTS 5,031,213  7/1991  Kawasaki .
5,477,538  12/1995  Huenlich ................................ 370/60.1
5,488,412  1/1996  Majeti et al. .............................. 348/10
5,623,677  4/1997  Townsley et al. ....................... 395/750
5,862,324  1/1999  Collins ................................ 395/200.5
5,872,771  2/1999  Park et al. ............................. 370/252

FOREIGN PATENT DOCUMENTS 0 333 466 A1  9/1989  European Pat. Off. .

Primary Examiner—Michael Horabik
Assistant Examiner—Man V. Phan
Attorney, Agent, or Firm—Hill & Simpson

[57] ABSTRACT

By acquiring the active and/or inactive state of multimedia communication terminal apparatuses (TV1. . . TVn) connected to a multimedia communication network (BPON), optimal use can be made of the switching-oriented and transmission-oriented resources (vr) of the multimedia communication network (BPON). In the multimedia communication network (BPON), unused allocated resources (zr) are automatically again released or, respectively, are cut off from a request of resources (zr), dependent on the acquired active and/or inactive states.

10 Claims, 1 Drawing Sheet

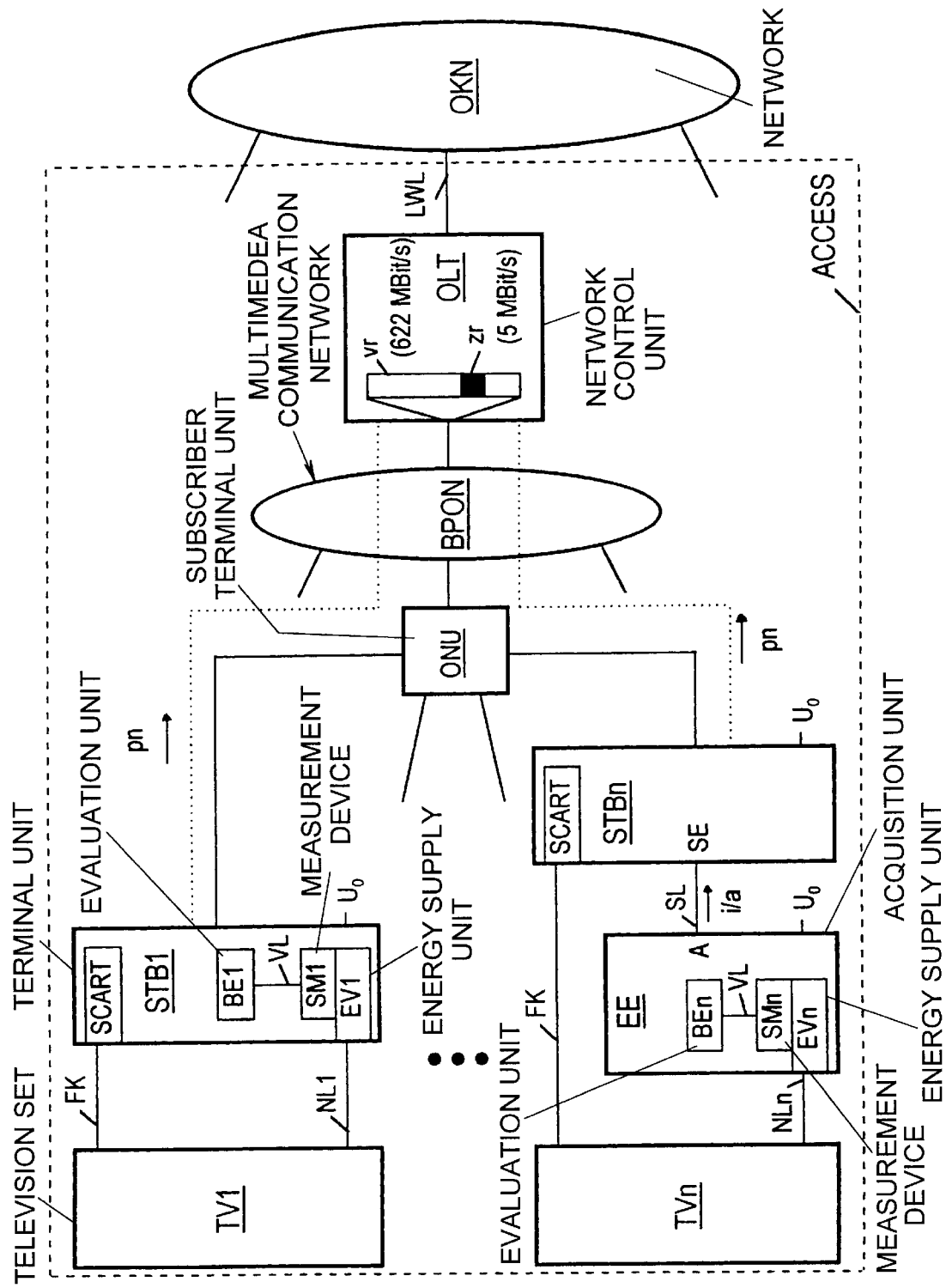

METHOD AND ARRANGEMENTS FOR THE OPTIMAL USE OF SWITCHING—ORIENTED AND TRANSMISSION—ORIENTED RESOURCES OF MULTIMEDIA COMMUNICATION NETWORKS

BACKGROUND OF THE INVENTION

In order to enable the use of broadband multimedia services, such as for example digital distribution television, via multimedia communication networks, individual programs to be transmitted to subscribers or requested video data ("video on demand", "multimedia on demand") are transmitted to individual virtual connections of an ATM-oriented (Asynchronous Transfer Mode) multimedia communication network. For the selection and reception of the digital video data, each subscriber requires a network terminal unit connected to the multimedia communication network. The unit is known to those skilled in the art as a "set-top box," to which a conventional TV device or a multimedia terminal apparatus can be connected via a conventional unidirectional interface (for example a SCART interface (Syndicat des Constructions d'Appareled Radio, Recepteurs et Televiseurs), a conventional TV set or a multimedia terminal apparatus). The selection of a current program or of the desired digital video data ensues via the remote operation of the set-top box. In this box, a protocol message is formed that indicates the selected video data, and is transmitted via a subscriber terminal unit to a network control unit arranged in the multimedia communication network. This control unit manages the allocation of the available resources or bandwidth between the subscriber terminal unit and the network control unit. In order to ensure the optimal use of the available resources or bandwidth, that is to avoid redundancy in the transporting of the video data, only the current programs or digital video data requested via the set-top boxes are distributed to the respective subscriber terminal unit by the network control unit. If a set-top box requests a program or digital video data, the bandwidth or, respectively, free virtual connection required for the transmission of the digital video data is reserved or, respectively, allocated by the network control unit, insofar as the requested program or, respectively, digital video data are not already transmitted for another set-top box. If an end of the requested video data transmission is signaled by the set-top box, the allocated resources (that is, the virtual connection reserved therefor) are again released, provided the relevant digital video data is not to be transmitted for any additional set-top box.

In the releasing of resources, that is the bandwidth of the allocated digital video data, the following problem now arises. If a subscriber switches off the TV set connected to the set-top box (for example, switching into standby mode via remote control) without communicating the termination of the requested video data transmission to the set-top box, the set-top box cannot transmit the end of the video data request to the network control unit. If no other set-top box receives the same program or the same digital video data, the allocated bandwidth remains allocated for the now switched-off TV set, whereby the allocated virtual connection remains unused. in the extreme case, the switching-oriented resources and transmission-oriented resources between the network control unit and the subscriber terminal unit are blocked by virtual connections that are allocated but are not being used.

SUMMARY OF THE INVENTION

It is an object of present invention to provide optimized use of switching-oriented resources and transmission-oriented resources of multimedia communication networks.

An important aspect of the inventive method is that the active state and/or the inactive state of multimedia communication terminal apparatuses is checked and is signaled to the multimedia communication network in the sense of an optimal use of the switching-oriented and transmission-oriented resources of multimedia communication networks. By means of this measure, the transmission-oriented capacity of the multimedia communication network is optimally utilized, since allocated but unused transmission-oriented resources, in particular in the feeder range of broadband networks, are automatically released.

The result of the checking of the active state and/or of the inactive state of the multimedia communication terminal apparatuses is advantageously communicated to a network control unit. Using the communicated checking result, the control unit maintains the allocation of or releases the switching-oriented and transmission-oriented resources, allocated to the individual multimedia communication terminal apparatuses, of a multimedia communication network arranged between the network control unit and a subscriber terminal unit. The network control unit is connected with a higher-level multimedia communication network and the subscriber terminal unit is connected with at least one multimedia communication terminal apparatus via a multimedia network terminal unit (set-top box). By means of the checking and communication of the active state and/or of the inactive state of multimedia communication terminal apparatuses connected to the multimedia communication network, the resources, that is the bandwidth of a multimedia communication network arranged between the network control unit and a subscriber terminal unit, are optimally utilized, since unused allocated bandwidth or, respectively, unused allocated virtual connections are released by the network control unit.

The active state and/or the inactive state of the multimedia communication terminal apparatuses connected with the multimedia communication network via the multimedia network terminal unit can be determined in a particularly effective and thus economical manner. This is accomplished by respectively identifying the level of the electrical power supplied to the individual multimedia communication terminal apparatuses, and forming therefrom power measurement values representing the level of the supplied electrical power. These values are evaluated such that when an electrical power measurement value exceeds a predeterminable value, the active state of the respective multimedia communication terminal apparatus is determined, and when electrical power measurement value falls below the predeterminable value, the inactive state of the respective multimedia communication terminal apparatus is determined. The active or, respectively, inactive state is then transmitted to the network control unit. Likewise, according to a further advantageous variant construction, the power measurement values formed can be evaluated such that the active state of the respective multimedia communication terminal apparatus is determined when a power measurement value increases by a difference amount. The inactive state of the respective multimedia communication terminal apparatus is determined when a power measurement value decreases by the difference amount. The level of the electrical power respectively supplied to the multimedia communication terminal apparatuses can be determined in a particularly simple fashion and with a small circuit-oriented outlay by a voltage measurement, a current measurement or a power measurement.

The means for checking the active state and/or the inactive state of the at least one multimedia communication terminal apparatus, connected with the multimedia communication network via a multimedia network terminal unit and a subscriber terminal unit, can be differently realized, dependent on the economic outlay. According to a first variant construction, these means can be realized in the multimedia network terminal unit. In a second variant construction, the means for checking the active state and/or the inactive state of a multimedia communication terminal apparatus can likewise be integrated into the multimedia communication terminal apparatus. As a third variant construction, the means for checking the active state and/or the inactive state of the multimedia communication terminal apparatuses can be realized in a separate acquisition unit arranged between the multimedia communication terminal apparatus and the multimedia network terminal unit.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, in which:

The single FIGURE depicts a multimedia network according to the present invention.

DESCRIPTION OF THE PREFERRED EMBODIMENTS

The single FIGURE shows a multimedia communication network BPON that is arranged between a network control unit OLT and a subscriber terminal unit ONU and is designed according to the asynchronous transfer mode (ATM). In this network, for example the level of the data transmission rate in the direction of the subscriber terminal unit ONU (downstream) is 622 Mbit/s, and in the direction of the network control unit OLT (upstream) is 200 Mbit/s. The network control unit OLT is connected to a higher-level multimedia communication network OKN via light waveguides LWL, and represents the network termination of the higher-level multimedia communication network OKN. Through the use of the bandwidth of the light waveguide LWL, m virtual connections that transmit digital video data are led to the network control unit OLT. In the subscriber terminal region ACCESS, several multimedia network terminal units STB1 . . . STBn, connected with the network supply voltage $U_O$ and designated "set-top boxes" below, are connected via the subscriber terminal unit ONU with the multimedia communication network BPON via glass fiber cable or copper lines. A conventional television set TV1 . . . TVn is connected via a television cable FK to an interface module SCART realized in the set-op box STB1 . . . STBn.

Digital video data offerings supplied to the network control unit OLT, such as commercial television programs or feature films ("video on demand," "pay TV"), can be requested via the remote control of the set-top box STB1 . . . STBn (standardly wireless). For this purpose, the set-top box STB1 . . . STBn forms a corresponding protocol message pn containing the request, and transmits it, via the subscriber terminal unit ONU and via the multimedia communication network BPON arranged in the subscriber terminal region ACCESS, to the network control unit OLT, which manages the allocation of the m virtual connections, supplied via the higher-level multimedia communication network OKN, to the limited resources of the multimedia communication network BPON (622 Mbit/s), for example, the allocation of the limited number n (n<m) of virtual connections that can be allocated for a data transport. In broadband as well as narrow-band services (for example, telephone and fax), the current traffic flow ("bursty traffic") over the multimedia communication network BPON cannot be foreseen. In order to make optimal use of the limited resources of the multimedia communication network BPON, only the digital video data requested by the set-top boxes STB1 . . . STBn are conducted via the limited number n (n<m) of the virtual connections available for a data transport via the multimedia communication network BPON. In order to avoid redundancy, that is, multiple transmission of the digital video data by the network control unit OLT via the multimedia communication network BPON to the subscriber terminal unit ONU, when there is a multiple request of the same digital video data by different set-top boxes STB1 . . . STBn only one virtual connection is allocated by the network control unit OLT. The requested digital video data are distributed to the respective set-top boxes STB1 . . . STBn by the subscriber terminal unit ONU. If a set-top box STB1 . . . STBn signals the end of a data request by means of a corresponding protocol message pn, the virtual connection allocated for the transmission of the digital video data, that is, the allocated resources or allocated bandwidth, is released again by the network control unit OLT, if the digital video data concerned are not supposed to be transmitted for any further set-top box STB1 . . . STBn via the multimedia communication network BPON.

According to a first advantageous variant construction of the inventive method, the TV set TV1 connected with the set-top box STB1 is connected via a network line NL1 with an energy supply unit EV1 arranged in the set-top box STB1, and is supplied with voltage and current by this unit. Due to the fact that the energy supply of the TV set TV1 ensues via the set-op box STB1, a switching of the TV set TV1 into the inactive state or, respectively, a switching into the standby mode, indicating a breaking off of the transmission of requested video data, can be acquired via the set-top box STB1. For this purpose, a measurement means SM1 for measuring the momentary strength of the current supplied to the TV set TV1 is assigned to the energy supply unit EV1 arranged in the set-top box STB1. The measurement values of the current strengths measured by the measurement means SM1 at regular intervals are supplied via a connection line VL to an evaluation unit BE1 that is likewise arranged in the set-top box STB1. When the TV set TV1 is switched off or is switched into standby mode, the current strength measured by the measurement means SM1 decreases significantly. If the measured current strength falls below a certain arbitrarily predeterminable threshold value (the standby mode can be acquired by means of the introduction of a threshold value), the inactive state of the television set TV1 is recognized by the evaluation unit BE1, and a corresponding protocol message pn is formed in the set-top box STB1. This message is transmitted to the network control unit OLT via the subscriber terminal unit ONU and the multimedia communication network BPON (indicated by dotted lines). After the evaluation of the transmitted protocol message pn in the network control unit OLT, the allocated resources zr, that is the virtual connection allocated for the transmission of the digital video data (for example, with a transmission rate of 5 Mbits), are again released, taking into account the conditions cited.

According to a further advantageous variant construction of the inventive method, a separate acquisition unit EE, connected with the network supply voltage $U_O$, is arranged between the set-top box STBn and the television set TVn connected thereto via a television cable FK. In contrast to the variant construction already cited, the television set TVn is supplied with energy or, respectively, voltage and current by an energy supply unit EVn arranged in the acquisition unit EE, via a network line NLn. In order to acquire a switching of the television set TVn into the inactive state, and in order thereby to cause a breaking off of the transmission of requested digital video data, a measurement installation SMn for measuring the momentary strength of the current supplied to the television set TVn is assigned to the energy supply unit EVn, whereby the measurement values of the current strengths measured at regular intervals are supplied via a connection line VL to an evaluation unit BEn arranged in the acquisition unit EE. If the current strength falls under an arbitrarily determinable threshold value, the inactive state of the television set TVn is determined by the evaluation unit BEn, and an inactive state signal i is formed that is conducted to an input SE of the set-op box STBn via an output A of the acquisition unit EE and a signaling line SL. In this box, a protocol message pn, containing the end of the transmission of the digital video data, is formed and is forwarded to the network control unit OLT via the subscriber terminal unit ONU and the multimedia communication network BPON, whereby allocated resources zr are released in the manner specified. If the current strength exceeds the arbitrarily determinable threshold value, the active state of the television set TVn is determined by the evaluation unit BEn and an active state signal a is formed, which is conducted to the input SE of the set-top box STBn via the output A of the acquisition unit EE and the signaling line SL. According to the inventive method, given a request for digital video data, a corresponding protocol message pn containing the request is formed in the set-top box STBn only if an active state signal a, generated in the acquisition unit EE, is supplied to the input SE of the set-top box STBn via the signaling line SL. That is, the resources zr required for the transmission of the digital video data are requested by the set-top box STBn only if the television set TVn is switched on, or, respectively, is switched into the active state.

According to a further variant construction (not shown), the measurement means SMn, arranged in the specified acquisition unit EE, for measuring the momentary strength of the current supplied to the television set TVn, as well as the evaluation unit BEn for the formation of an active state signal a, can also be realized in the respective television set TV whose active state and/or inactive state are to be acquired. The formed active state signal a or, respectively, inactive state signal i is thereby conducted directly to an input SE of the set-top box STB via a connection line VL.

By means of the specified construction of the inventive method, optimal use is made of the transmission-oriented and switching-oriented resources vr of a multimedia communication network BPON arranged between the network control unit OLT and the subscriber terminal unit ONU, since allocated, unused virtual connections that are conducted via the multimedia communication network BPON are not activated or, respectively, are released by the network control unit OLT, and the availability of broadband and narrow-band services of the multimedia arrangement is thus maintained.

The invention is not limited to the particular details of the method and apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for optimal use of switching-oriented and transmission-oriented resources of multimedia communication networks with multimedia network terminal apparatuses connected via multimedia network terminal units, comprising the steps of:

determining a level of electrical power supplied to individual multimedia communication terminal apparatuses;

forming power measurement values representing the level of the supplied electrical power;

evaluating the values such that when an electrical power measurement value exceeds a predeterminable value, an active state of the respective multimedia communication terminal apparatus is determined, and when an electrical power measurement value falls below a predeterminable value, an inactive state of the respective multimedia communication terminal apparatus is determined; and transmitting the active or, respectively, inactive state to the multimedia communication network for an optimal use of the switching-oriented and transmission-oriented resources of multimedia communication networks.

2. The method according to claim 1 wherein the switching-oriented and transmission-oriented resources are requested dependent on the communicated checking result.

3. The method according to claim 1, wherein upon determining the active or, respectively, inactive state, the switching-oriented and transmission-oriented resources, allocated to the respective multimedia communication terminal apparatus, of a multimedia communication network arranged between a network control unit and a subscriber terminal unit remain allocated or released, and wherein the network control unit is connected with at least the respective multimedia communication network and the subscriber terminal unit is connected with at least the respective multimedia communication terminal apparatus via a multimedia network terminal unit.

4. The method according to claim 3, wherein the switching-oriented and transmission-oriented resources of the multimedia communication network arranged between the network control unit and the subscriber terminal unit are realized by virtual connections that operate according to asynchronous transfer mode, and wherein a virtual connection is allocatable to each multimedia data source provided in the network control unit.

5. The method according to claim 3, wherein the method further comprises:

transmitting the active state or, respectively, the inactive state to the network control unit.

6. The method according to claim 1, wherein the level of the electrical power respectively supplied to the multimedia communication terminal apparatus is determined by one of a voltage measurement, a current measurement and a power measurement.

7. A multimedia network terminal unit for connecting at least one multimedia communication terminal apparatus to a multimedia communication network comprising:

energy supply for the at least one multimedia communication terminal apparatus;

a device for determining a level of electrical power supplied to the at least one multimedia communication terminal apparatus and for forming power measurement values representing the level of the supplied electrical power;

an evaluation unit that receives the power measurement values, that forms an active state signal when a power measurement value increases by a predeterminable difference amount or when a power measurement value exceeds a predeterminable value, and that forms an inactive state signal when a power measurement value decreases by the difference amount or when a power measurement value falls under a predeterminable value; and a system for inserting the active state signal or the inactive state signal into a protocol message in accordance with a protocol.

8. A multimedia communication arrangement with a multimedia network terminal unit connected with at least one multimedia communication terminal apparatus comprising:

the at least one multimedia communication terminal apparatus having a system for acquiring a level of supplied electrical power and for forming power measurement values representing the level of the supplied power;

an evaluation unit in the multimedia network terminal unit, the evaluation unit receiving the power measurement values; the evaluation unit having a device for forming an active state signal when a power measurement value exceeds a predetermined value or, when a power measurement value increases by a predeterminable difference amount;

the evaluation unit having a device for forming an inactive state signal when a power measurement value decreases by the difference amount, or when a power measurement value falls under a predeterminable value; the active state signal or inactive state signal being inserted into a protocol message in accordance with a protocol.

9. An acquisition unit for connecting at least one multimedia communication terminal apparatus to a multimedia network terminal unit, comprising:

device for supplying energy to the at least one multimedia communication terminal apparatus;

system for acquiring at least one of an active state and an inactive state of the at least one connected multimedia communication terminal apparatus and for respectively forming an active state signal or an inactive state signal based on received power measurement values associated with a level of the supplied energy, the system further having a device for acquiring a level of electrical power supplied to the at least one multimedia communication terminal apparatus and a device for forming the power measurement values representing the level of the supplied power;

an evaluation unit that receives the power measurement values;

the evaluation unit having a device for forming the active state signal when a power measurement value increases by a predeterminable difference amount, or when a power measurement value exceeds a predeterminable valu;

the evaluation unit having means for forming the inactive state signal when a power measurement value decreases by the difference amount, or when a power measurement value falls under a predeterminable value; and the active state signal or inactive state signal being conducted to an output of the acquisition unit that is connected to an input of the multimedia network terminal unit.

10. A multimedia communication arrangement with an acquisition unit for connecting at least one multimedia communication terminal apparatus and with a multimedia network terminal unit, comprising:

an acquisition unit having an energy supply for the at least one multimedia communication terminal apparatus;

the acquisition unit having a device for acquiring the level of the electrical power supplied to the at least one multimedia communication terminal apparatus and for forming power measurement values representing the level of the supplied electrical power;

an evaluation unit arranged in the multimedia network terminal unit, the evaluation unit receiving the power measurement values;

the evaluation unit, for forming an active state signal when a power measurement value increases by a predeterminable difference amount, or when a power measurement value exceeds a predeterminable value and a device for forming an inactive state signal when a power measurement value decreases by the difference amount, or when a power measurement value falls under a predeterminable value; and the active state signal or inactive state signal being inserted into a protocol message in accordance with a protocol.

* * * * *